United States Patent [19]

Maxwell et al.

[11] Patent Number: 4,809,433
[45] Date of Patent: *Mar. 7, 1989

[54] AGRICULTURAL SHEARS WITH LANCET BLADE

[75] Inventors: Georges A. Maxwell, Los Alamitos; Stephen Jasperson, Riverside, both of Calif.

[73] Assignee: Corona Clipper Company, Corona, Calif.

[*] Notice: The portion of the term of this patent subsequent to Mar. 17, 2004 has been disclaimed.

[21] Appl. No.: 863,735

[22] Filed: May 15, 1986

[51] Int. Cl.⁴ .............................................. B26B 13/06
[52] U.S. Cl. ...................................................... 30/254
[58] Field of Search .................................. 30/254, 271

[56] References Cited

U.S. PATENT DOCUMENTS

| | | | |
|---|---|---|---|
| 131,108 | 9/1872 | McElhaney | 30/254 |
| 1,520,529 | 12/1924 | Cagle | 30/254 |
| 2,348,903 | 5/1944 | Hart | 30/254 |
| 3,277,573 | 10/1966 | Nicoletta | 30/254 |
| 4,649,646 | 3/1987 | Lemcke | 30/231 |

FOREIGN PATENT DOCUMENTS 82275 10/1956 Denmark ............................ 30/254

Primary Examiner—E. R. Kazenske
Assistant Examiner—Michael D. Folkerts
Attorney, Agent, or Firm—Georges A. Maxwell

[57] ABSTRACT

An improved single-pass hook and blade type agricultural shear with a central pivotal axis. The shear includes an elongate hook with an outer end and an inner end pivotally supported about said axis. Said hook has a substantially radially extending circumferentially disposed concave branch supporting shearing edge. The shear next includes an elongate blade with an outer end and an inner end supported about said axis. Said blade has a substantially radially extending circumferentially disposed convex primary cutting edge opposing said shearing edge. The cutting edge has an outer portion and has an inner portion circumferentially offset from said outer portion and has a substantially circumferentially extending radially inwardly disposed intermediate cutting edge extending between the outer and inner portions of said primary cutting edge. The outer portion of the primary cutting edge and the intermediate cutting edge define a sharp pointed lancet blade between the ends of the primary cutting edge. The lancet blade pierces and holds branches engaged in and cut by the shear in advance of said primary cutting edge. The shear includes lever arms to pivot the hook and blade relative to each other and relative to branches engaged therebetween.

11 Claims, 2 Drawing Sheets

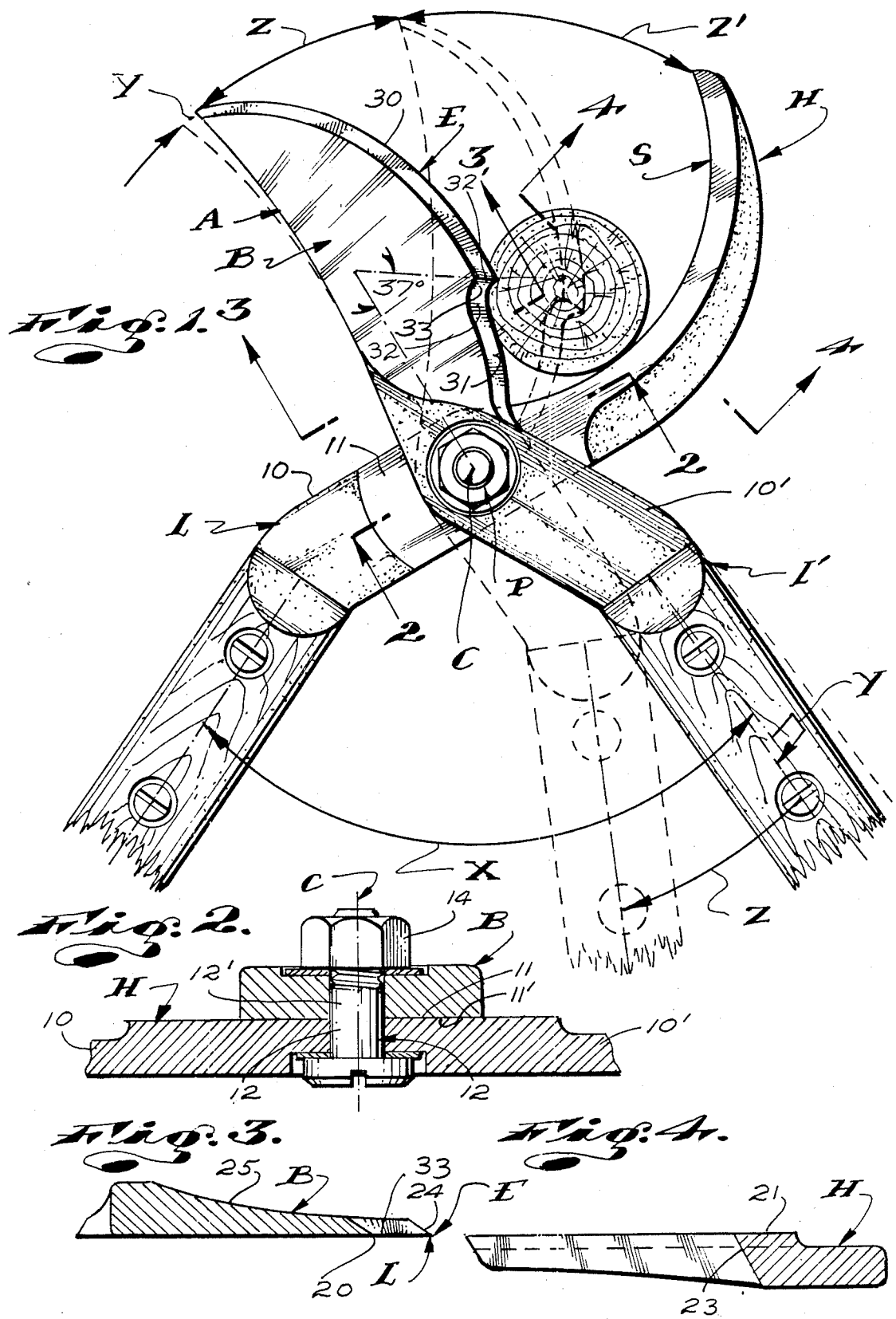

AGRICULTURAL SHEARS WITH LANCET BLADE

This invention has to do with an improved agricultural shear with lancet blade.

BACKGROUND OF THE INVENTION

In substantially all forms of agriculture, it is common practice to cut the branches, stems and stalks of plants to control or enhance their growth; harvest their products; enhance their appearance; remove or destroy them and the like.

To the above end, the prior art has developed and provides a variety of different kinds of shearing tools specially designed to perform particular cutting operations on different species of plants. Such shearing tools include small one-hand operated shears, larger two-hand operated lopping shears, and pole pruners for reaching and cutting remote branches and the like. The great majority of such shears are single-pass blade and hook type shears characterized by elongate blades and hooks with inner and outer ends, pivot means pivotally connecting the inner ends of the blades and hooks together and manually engageable lever arms projecting from the inner ends of the blade and hooks, opposite from the pivot means.

The hooks of the above type of shears are radially or parabolically curved to define longitudinally extending substantially concaved shearing edges disposed toward their related blades and which serve to receive and retain a branch or the like to be cut. The hooks have flat passing surfaces on radial planes with respect to their pivotal axes and which converge with the referred to shearing edges.

The blades of such shears are flat blades with radially or parabolically curved convex cutting edges disposed towards their related hooks on radial planes immediately adjacent the flat passing surfaces of their related hooks and have flat passing surfaces which oppose and establish sliding engagement with the passing surfaces of the hooks. Such shears are manually pivotally operated from first open positions where the hooks and blades are angularly related to diverge radially relative to each other from their common pivotal axis to closed positions where the cutting and shearing edges of the blades and hooks have moved by each other and the blades and hooks are in substantial parallel juxtaposition. When such shears are moved or actuated from their open to their close positions, branches engaged between the blades and hooks are supported by the hooks and the blades are advanced through and cut them.

In single-pass shears of the class referred to above and here concerned with, the curvature and relationship of the concave shearing edges and convex cutting edges of the shears is carefully designed so that when the blades and hooks are in their open position, the branch engaged therebetween is most effectively retained and is least likely to be urged radially outwardly therebetween or displaced when the shears are advanced from their open to their closed positions. Further, the blades and hooks are designed so that when they are moved from their open to close positions, the raidial inner end portions of the cutting edges lead or are in advance of their related outer portions and the cutting edges effectively slice through and cut the branches cleanly.

In the case of common prior art single-pass blade and hook type shears of the general character referred to, while made to retain and prevent displacement of branches, as above noted, nonetheless tend to displace or eject branches. The tendency for such shears to eject branches increases greatly as the size of branches worked upon increases and as the hardness of the branches increases. For example, large, dry or dead branches of hardwood plants, such as citrus trees and grapevines, are often such that they cannot be easily and satisfactorily cut with shears that will easily and effectively cut green or soft wood branches of equal or greater size. The tendency for such shears to eject large and hard branches is due to the fact that the cutting edges of such shears fail to establish adequate entry into the branches to progressively slice through them. Instead, the cutting edges tend to stop against and slide on or across the branches and thereby urge the branches radially outwardly between the blades and hooks as they are pivoted towards their closed positions.

The prior art has sought to prevent the tendency for shears to eject branches in the manner set forth above by serrating the cutting and/or shearing edges to increase the friction between the branches and those edges and affording greater opportunity for the cutting edges to penetrate the branches. Some in the prior art have claimed that serrating the cutting edges of such shears imparts the shears with a "sawing action", as the cutting edges slice into related branches. This claim has been carefully studied and has been found to have little merit. The most that such serrations appear to do is to first scarify or mutilate the surfaces of branches worked upon and second, to load up the serrations with vegetable fiber and the like and to thereby reduce the cutting efficiency of the shears.

Other attempts to prevent or reduce the tendency for shears to eject branches in the manner noted above have involved making the cutting edges undulating or sinuate and to thereby seek to capture branches being worked in the valleys of the undulating cutting edges as such shears are closed. The above has proven to be of some benefit in straight-edged hedge shears and the like but the advantages gained are seen to be outweighed by the added cost of establishing such edges and the inconvenience encountered when sharpening such edges. Such sinuate or serpentine edges have proven to be ill-suited for use in other than straight or substantially straight-edged shears.

OBJECTS AND FEATURES OF THE INVENTION

It is an object and feature of this invention to provide an improved blade and hook type agricultural shear structure of the general character referred to above wherein the cutting blade is formed with a radially inwardly inclined lancet blade between the ends of the convex cutting edge of the cutting blade to pierce branches supported by the hook of the shears and which prevents radial outward displacement of the branches relative to the blade and hook as the shears is closed.

It is an object and feature of the invention to provide an improved shears structure of the general character referred to above wherein said lancet blade establishes pilot penetration in branches worked upon and in advance of the cutting edge of the blade and to thereby materially enhance the cutting efficiency of the shears.

A further object and feature of the invention is to provide an improved shears structure of the general character referred to above wherein said lancet blade is positioned, proportioned and disposed so that when the blade and hook of the shears are closed into initial pressure contact with a branch engaged therebetween and the shears is quickly forcibly drawn in a direction away from the branch, the applied forces are directed through the lancet blade into the branch and drive that blade into secure penetrated engagement in the branch, preparatory to further closing of the shears and cutting of the branch.

It is yet another object and feature of the invention to provide an improved shears structure of the general character referred to above wherein said lancet blade is proportioned, positioned and disposed so that when the opened shears is advanced towards and into engagement with a branch, with the blade and hook in sliding pressure engagement therewith, the branch rides inwardly by the lancet blade and allows the shears to sharply move towards its closed position a readily perceptible distance and to thereby signal the operator that the shears and branch are securely interengaged for effective cutting of the branch by increased applied forces onto and through the shears.

Finally, it is an object and feature of the invention to provide an improved shears structure of the general character referred to above wherein a standard prior art shears structure in which the cutting blade is reformed to establish the noted lancet blade by an easy and economical to perform grinding operation during manufacture of the shears.

The foregoing and other objects and features of the invention will be apparent and will be fully understood from the following detailed description of preferred embodiments of the invention.

DESCRIPTION OF THE DRAWINGS

FIG. 1 is an elevational view of a shears structure embodying the invention;

FIG. 2 is an enlarged sectional view taken substantially as indicated by line 2—2 on FIG. 1;

FIG. 3 is an enlarged sectional view taken substantially as indicated by line 3—3 on FIG. 1;

FIG. 4 is an enlarged sectional view taken substantially as indicated by line 4—4 on FIG. 1;

DETAILED DESCRIPTION OF THE INVENTION

Figure 5:
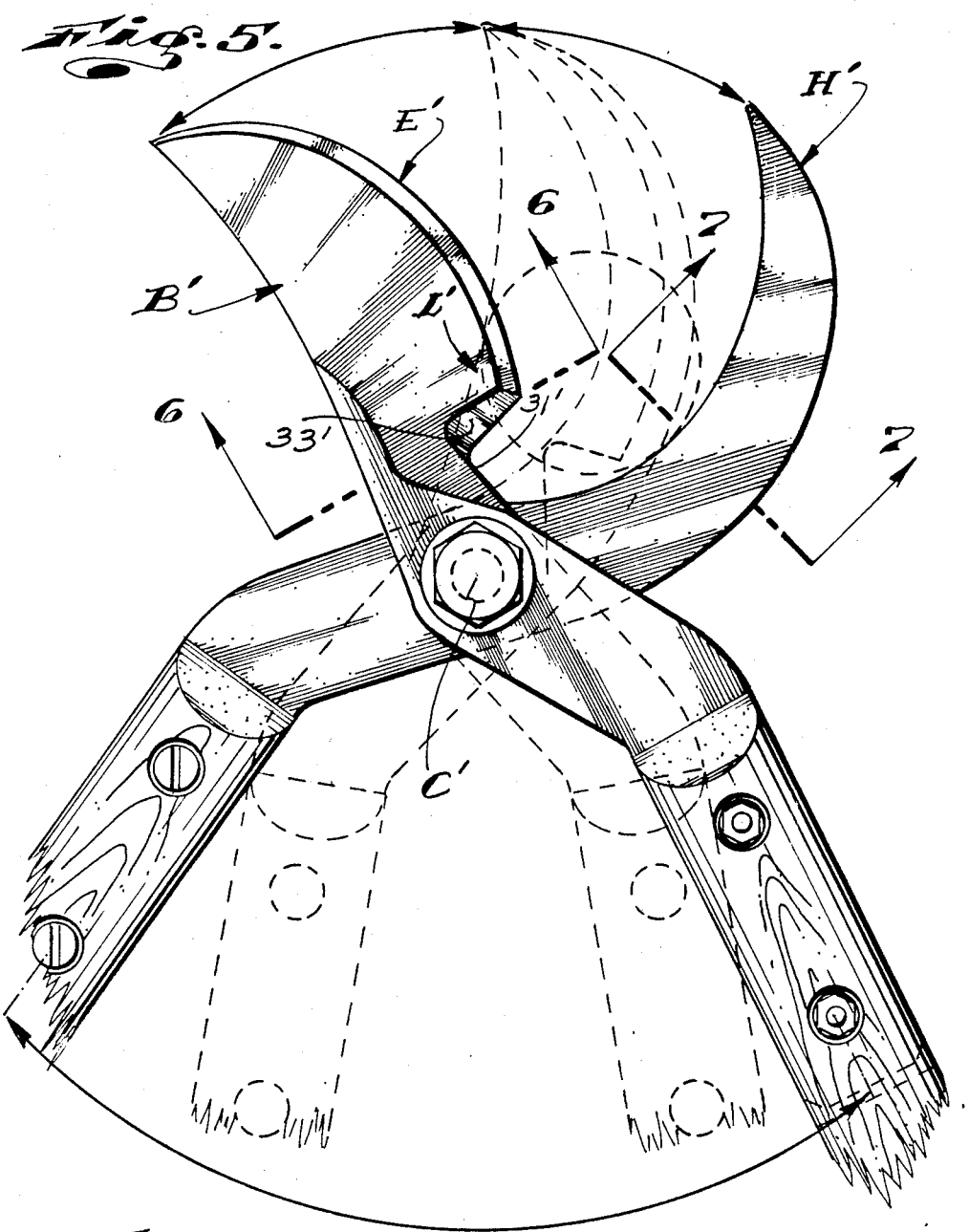
FIG. 5 is a view similar to FIG. 1 showing another embodiment of the invention.

For the purpose of this disclosure, a standard, modified single-pass blade and hook-type lopping shears is illustrated in the drawings and will be described. Lopping shears are large shears with long handles and are adapted to be operated with two hands. Lopping shears are provided to cut large branches and the like where great force must be exerted.

It is to be understood that in practice, other smaller shears of the same or similar class, but made to be operated with one hand, can be made to incorporate the invention. For example, small all purpose pruning shears, such as are provided for pruning rose bushes, shrubbery and light trimming of fruit trees and the like, can be advantageously made to embody the invention.

Referring to FIG. 1 of the drawings, the shears A includes an elongate cutting blade B, an elongate hook H, pivot means P pivotally connecting the blade and hook together and elongate manually operable lever arms or handles L and L' to effect pivoting of the blade and hook relative to each other. But for the shape and interrelationship of the blade B and hook H, the shears structure A can vary widely in details of construction without departing from or adversely affecting the invention. Accordingly, since the basic construction of all such shears is the same and is well-known to all of those who are familiar with or skilled in the art, detailed description of other than the blade and hook can and will be treated lightly.

In FIGS. 1 and 2 of the drawings, the lever arms L and L' and the pivot means P are clearly and adequately shown and graphically described. It will be noted that the lever arms L and L' can be of any desired length and, for the purpose of this disclosure, are shown broken away.

The hook H and the blade B are integrally joined with their related lever arms L and L' by intermediate body portions 10 and 10'. The intermediate body portions 10 and 10' have flat opposing bearing surfaces 11 and 11' and axially aligned openings 12 and 12', through which a nut and bolt assembly 14 is engaged. The nut and bolt assembly 14 maintains the body portions 10 and 10' in assembled working relationship. The shank of the bolt of said assembly constitutes a pivot pin for the shears and defines the central pivotal axis C of the shears. The body portions 10 and 10' and the nut and bolt assembly 14 cooperate to define the above noted and referred to pivot means P.

To suitably orient and facialitate describing the various parts and portions of the shears structure A, the central or pivotal axis C will be defined as an elongate horizontal axis that is normal to and extends laterally through a vertical, central radial plane of the structure. The central radial plane has axially disposed opposite sides. The structure will also be described as having an axially extending vertical central plane which is normal to said pivotal axis and which bisects said radial plane.

The blade B is an elongate part with an outer free end and an inner end which is joined integrally or otherwise connected with the body portion 10'. The hook H is an elongate part with an outer free end and an inner end which is integrally joined with or otherwise suitably connected with the body portion 10.

The blade B projects upwardly from the related body portion 10' and is positioned adjacent one side of and is pivotaly movable about the axis C through the upper left-hand quadrant portion of said radial plane. The hook H projects upwardly from its related body portion 10 and is positioned adjacent the other side of and is pivotally movable about the axis C through the upper right-hand quadrant portion of said radial plane.

The lever arms L' and L extend downwardly from their related body portions 10 and 10' and are pivotally movable about the axis C within the lower right-hand and lower left-hand quadrant portions of said radial plane.

The shears structure A is manually operable between an open position such as shown in full lines in FIG. 1 of the drawings, where the blade and hook diverge upwardly and circumferentially from the left and right sides of said central vertical plane to a closed position where they extend substantially vertically on said central vertical plane and are in substantial parallel juxtaposition. When the blade and hook are pivotally moved from their open position to their closed position, the blade and hook move circumferentially inwardly towards said central vertical plane and towards each other. When they are moved or returned to their open position, they move circumferentially outward and away from each other and away from said central vertical plane.

The above noted pivotal movement of the blade and hook is effected by manual counter pivotal movement of their related lever arms L and L'.

The blade B and hook H have flat axially disposed opposing passing surfaces 20 and 21 which occur on said central radial plane and which establish sliding engagement with each other during operation of the shears.

The hook H has an elongate longitudinally or substantially radially extending circumferentially inwardly opposed concave shearing edge S. The shearing edge S can be radially or parabolically curved as desired or as circumstances require. The edge S is defined by the convergence of the passing surface 21 of the hook and a substantially radially extending substantially circumferentially inwardly disposed concave work supporting surface 23, as clearly shown in FIG. 4 of the drawings.

The cutting blade B is a flat part on a plane parallel with and adjacent to said radial plane and has an elongate substantially radially extending circumferentially inwardly disposed convex cutting edge E. The cutting edge can be curved radially or parabolically as desired or as circumstances require. The cutting edge E is defined by the convergence of the passing surface 20 of the blade and a circumferentially and axially inwardly inclined edge surface 24, as clearly shown in FIG. 3 of the drawings. In practice, the axially outwardly disposed or exterior surface of the blade can be "hollow ground", as indicated at 25, to reduce the bulk of the blade, in accordance with common practice.

To the above extent, the shears structure A is not unlike many common lopping shears provided by the prior art.

In furtherance of this invention, the cutting edge E of the blade B has an outer portion 30 extending radially throughout the outer portion of the blade and has an inner portion 31 extending radially throughout the inner portion of the blade.

In the particular case illustrated, the outer portion 30 of the cutting edge is coextensive with the outer two-thirds of the blade and the inner portion is coextensive with the inner one-third portion of the blade. The inner and outer portions 30 and 31 of the edge E are circumferentially offset, that is, the outer portion 30 is offset circumferentially inwardly from the inner portion 31, or the inner portion 31 is offset circumferentially outward from the outer portion 30. The offset inner and outer portions 30 and 31 of the edge E are joined by a small, preferably radiused, circumferentially and radially inwardly disposed intermediate cutting edge 32. The radial inner end of the intermediate cutting edge 32 joins smoothly into and with the outer end of the inner portion 31 of the cutting edge and the outer end of said intermediate cutting edge 32 converges with the radial inner end of the outer portion 30 of the cutting edge E at substantially right angle thereto.

The offset of the inner and outer portions 30 and 31 of the cutting edge E and the intermediate edge 32 cooperate to define an intermediate lancet blade or lancet blade portion L with a sharp, radially inwardly and circumferentially inwardly disposed point 33 and substantially radially and circumferentially outwardly and substantially radially and circumferentially inwardly disposed divergent cutting edges. The intermediate edge 32 defines the radially and inwardly disposed edge of the lancet blade portion L and the inner end portion 32' of the outer portion 30 of the cutting edge E defines the radially and circumferentially outwardly disposed edge of the lancet blade portion or lancet blade L.

The placement of the lancet blade L longitudinally of the cutting edge E is dependent upon the longitudinal extent and the convex curvature of the cutting edge E and the concave curvature of its related shearing edge S of the hook H. Each of the foregoing factors is subject to notable variation in different makes and models of single-pass blade and hook-type shears. In addition to the above, the circumferential displacement of the inner and outer portions 30 and 31 of the cutting edge E and the resulting "size" of the lancet blade L is subject to being varied in different makes and models of shears that are designed to perform special work. Still further, the shape and placement of the intermediate edge 30 is subject to being varied in different makes and models of shears so that the central or mean axis of the lancet blade L and the direction in which its point 33 is disposed can be properly established.

In the preferred carrying out of the invention, the central or mean axis of the lancet blade and/or the angle at which its point 33 is directed is preferably radially and circumferentially inclined at an acute angle with respect to the central or mean longitudinal radial axis of the blade. For example and as shown in FIG. 1 of the drawings, the said central or mean axis of the lancet blade L is at 37° relative to the central radial or longitudinal axis of the blade B.

Due to the curvature of and the relationship between the cutting edge E and the curvature of the shear edge S of the hook H, it is difficult to accurately and clearly describe the placement and position of the lancet blade L. In practice, when making the shears structure A, one skilled in the art can easily visually perceive where the lancet blade would best be located, the direction in which its point would best be directed, and that size it must be for most effective and efficient operation. Easy and quick empirical testing of one or a limited number of test shears can establish the ultimate design for any shears embodying the invention preparatory to regular production thereof.

Proper radial placement of the lancet blade L is such that the point of that blade occurs radially outward of the central axis of the largest size branch (piece of work) which the shears is intended to cut, when the shears is fully open and such a branch is fully engaged therein. Such placement of the lancet blade assures that the lancet blade, upon operation and closing of the shears on such a branch, will pierce its adjacent opposing side or surface of the branch at a point radially outward from the center of the branch. Thus, when the shears is put to its intended use, the lancet blade L engages and penetrates a branch in advance of the outer cutting portion 30 of the cutting edge E and prevent or inhibits radial outward slipping and displacement of the branch between the hook H and the blade B as they are pivotally urged towards each other and the branch.

In operation, after the point 33 of the lancet blade L initially engages a branch and the blade and hook are forcibly moved circumferentially inwardly towards each other, applied forces are concentrated at the point 33 of the blade L and the blade L is forcibly entered into the branch. Upon penetration of the lancet blade into the branch, the cutting edges thereof establish pilot cut in the branch in advance of the outer and inner portions 30 and 31 of the cutting edge E.

With such pilot cuts established in the branch, subsequent advancing of the cutting edge portions 30 and 31 of the edge 30 into and through the branch is made notably easier.

It is to be noted that the inner portion 31 of the cutting edge E cuts that portion of a branch which occurs radially inward of the lancet blade L in a regular manner and with desired slicing action. Accordingly, the portion of the branch worked upon by the inner portion 31 of the cutting edge E is cut smoothly and cleanly. In this regard, it will be apparent that the portions 30 and 31 of the cutting edge 30 must not be offset excessively and the lancet blade must not be made so large that it will tend to split and/or rupture a branch being worked upon, in advance of the portions 30 and 31 of the cutting edge E. If the lancet blade is made in such a manner that it tends to split and/or rupture branches worked upon, in advance of the portions 30 and 31 of the cutting edge E, the shears structure will be such that it tends to mutilate rather than cut branches and would be clearly unsatisfactory.

In accordance with the foregoing, it has been determined that the circumferential offset of the portions 30 and 31 of the cutting edge E and the resulting size and-/or circumferential extent of the lancet blade L should not exceed approximately one-quarter the diameter of the average size branch the shears is made to cut and in most cases need not exceed about one-sixteenth the average diameter of branches to be cut.

In operation and use of the shears structure A, the shears structure can be open to an extent necessary to enter a branch between the outer end portions of the blade and the hook and can thereafter be manually urged toward that branch so that the branch slides inwardly between the hook and the blade. As the branch moves inwardly relative to the hook and blade, it is pivoted open progressively. When the branch moves radially inward by the lancet blade L, the shears will close sharply a limited distance signalling the operator that the branch is properly and fully engaged for subsequent forcible closing of the shears and effective and efficient cutting of the branch.

Still further, when small, very hard branches are being cut, the shears can be fully open and a branch can be moved radially inwardly into full engagement between the hook and the blade. Thereafter, the shears can be closed to slidably engage the branch. Thereafter, the shears can be sharply drawn in a direction away from engagement with the branch. When the shears is thus drawn away from the branch, the lancet blade is moved quickly into engagement with and is forcibly driven into the branch. Thereafter, the shears is operated in regular fashion to cut the branch. In accorance with the foregoing, the shears can effectively cut those hard, dry, dead branches and the like that ordinarily resist cutting and which are often slidably ejected from between the hooks and blades of ordinary shears.

In FIG. 1 of the drawings, the arrow X indicates the relative pivotal movement of the blade and hook between their open and closed positions. The arrows Z indicate that limited pivotal movement towards a closed position which occurs between the blade and hook when a branch, slidably engaged between the blade and hook, is moved radially inwardly by the lancet blade. The arrows Z indicate the extent of relative pivotal movement of the blade and hook when the shears structure is in that intermediate position shown in dotted lines. The arrow Z' indicates the relative movement of the blade and hook when moved from said intermediate position to a fully closed position.

Figure 6:
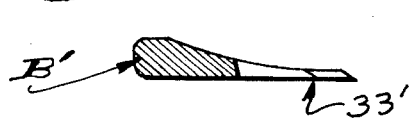
FIG. 6 is a sectional view taken as indicated by line 6—6 on FIG. 5.
Figure 7:
FIG. 7 is a view taken as indicated by line 7—7 on FIG. 5.

In FIGS. 5 through 7 of the drawings, a second embodiment of the invention is illustrated. In this second embodiment of the invention, the lancet blade L' is located radially inward and closer to the pivotal axis C' of the shears structure. The lancet blade L' is at the radial inner end of the cutting edge E' of the blade B' and is defined by the convergence of the inner end portion of the edge E' and a straight, right angularly related secondary cutting edge 33'. The secondary cutting edge 33' is of substantial longitudinal extent and is disposed substantially radially inwardly. The circumferential outer end of the secondary cutting edge 33' joins a straight, inner edge portion 31' of the blade B'. The inner edge portion 33' of the blade B' can be a sharpened edge, as in the first embodiment of the invention or can, as shown, be an unsharpened portion of the edge E'.

It will be noted that the lancet blade L' in this second embodiment of the invention is substantially larger than the lancet blade L in the first embodiment of the invention and is notably closer to the pivotal axis C' so that substantially greater mechanical advantage is afforded to drive the lancet blade into a branch being worked upon.

It will be further noted that with the second embodiment of the invention, the secondary cutting edge 33' of the lancet blade is in the nature of a substantially right angularly related extension of the outer sharpened portion of the edge E' and serves to cut a related portion of a branch simultaneously with or at the same time that the sharpened portion of the cutting edge E' cuts into its related portion of a branch.

Still further, it will be apparent and it is to be noted that the lancet blade L' in the second embodiment of the invention tends to tear, rip and/or rupture the portions of branches it works directly upon and that a clean, smooth cut cannot be assured. Thus, the secondary embodiment of the invention is not preferred for general and most special uses, but rather is a rugged and powerful tool that is particularly suited for use in forestry work and the like to quickly and easily cut and thin heavy scrub brush, thickets and the like to clean paths and establish fire breaks. That is, it is particularly suited for use in those situations where heavy and difficult cutting must be performed rapidly and with minimum effort and where moderate damage to branches cut is of no concern.

In accordance with the foregoing, this second embodiment of the invention is a specialized tool for limited use and is illustrated to show a typical modified embodiment of the invention.

Having described typical preferred forms and embodiments of the invention, we do not wish to be limited to the specific details herein set forth but wish to reserve to ourselves any modifications and/or variations that might appear to those skilled in the art and which fall within the scope of the following claims:

Having described our invention, we claim:

1. An agricultural shear having a laterally extending, horizontal central axis, a central radial plane with axially disposed opposite sides concentric with said central axis and a central inner vertical plane with outwardly disposed opposite sides parallel with the central axis and bisecting said radial plane; said shear includes an elongate hook with a radially extending mean axis, an upper free end and a lower end pivotally mounted about said central axis adjacent one side of said radial plane, an elongate cutting blade with a radially extending mean axis, an upper free end and a lower end pivotally mounted about said central axis adjacent the other side of said radial plane, said hook has an axially inwardly disposed passing surface at and opposing one side of the radial plane and has a substantially radially extending concave work supporting shearing edge normally disposed substantially circumferentially inwardly towards said inner vertical plane, said cutting blade has an axially inwardly disposed passing surface at and opposing the other side of the radial plane and has a substantially radially extending convex primary cutting edge normally disposed substantially circumferentially inwardly towards said inner vertical plane and opposing said shearing edge, elongate manually engageable levers extend substantially downwardly from the lower ends of the hook and cutting blade to pivot the hook and cutting blade circumferentially about said central axis between opened positions where the cutting blade and hook project upwardly and circumferentially from the opposite sides of the inner vertical plane and closed positions where the shearing and primary cutting edges move inwardly by each other and the passing surfaces of the hook and cutting blade occur in opposed juxtaposition, said primary cutting edge has a substantially radially extending upper portion with a lower end, a substantially radially extending lower portion with an upper end and offset circumferentially outwardly from the lower end of said upper portion, said cutting blade has an intermediate cutting edge angularly related to and extending substantially circumferentially between said upper and lower ends of said upper and lower portions of the primary cutting edge, said intermediate cutting edge and the lower end portion of said upper portion of the primary cutting edge are angularly related and converge to define a pointed lancet blade portion with converging cutting edges and a mean center line bisecting the angle between its converging cutting edges that extends circumferentially and radially inwardly relative to said mean axis of said cutting blade.

2. The shear set forth in claim 1 wherein said shearing edge on said hook is defined at the convergence of a substantially radially extending elongate circumferentially inwardly disposed concave work supporting surface and the passing surface of said hook.

3. The shear set forth in claim 1 wherein said upper and lower portions of the primary cutting edge, the intermediate cutting edge and the point of said lancet blade portion are defined at the convergence of axially and substantially circumferentially and radially inwardly inclined surfaces on said cutting blade and said passing surface of said cutting blade.

4. The shear set forth in claim 1 wherein said shearing edge on said hook is defined at the convergence of a substantially radially extending elongate circumferentially inwardly disposed concave work supporting surface and the passing surface of said hook, said upper and lower portions of the primary cutting edge, the intermediate cutting edge and the point of said lancet blade portion are defined at the convergence of axially and substantially circumferentially and radially inwardly inclined surfaces on said cutting blade and said passing surface of said cutting blade.

5. The shear set forth in claim 1 wherein said lancet blade portion is spaced radially outward and upward from the lower end of said cutting blade a distance greater than one-half the cross-sectional extent of the largest size piece of work the shear is designed to cut.

6. The shear set forth in claim 1 wherein said lancet blade portion is spaced radially outward from the lower end of said cutting blade a distance greater than one-half the cross-sectional extent of the largest size piece of work the shear is designed to accommodate between the hook and the cutting blade and to cut, said shearing edge on said hook is defined at the convergence of a substantially radially extending elongate circumferentially inwardly disposed concave work supporting surface and the passing surface of said hook.

7. The shear set forth in claim 1 wherein said lancet blade portion is spaced radially outward from the radial inner ends of said hook and cutting blade a distance greater than one-half the cross-sectional extent of the largest size piece of work the shear is designed to accommodate and cut, said upper and lower portions of the primary cutting edge, the intermediate cutting edge and the point of said lancet blade portion are defined at the convergence of axially and substantially circumferentially and radially inwardly inclined surfaces on said cutting blade and said inner passing surface of said cutting blade.

8. The shear set forth in claim 1 wherein said lancet blade portion is spaced radially outward from the radial inner ends of said hook and blade a distance greater than one-half the cross-sectional extent of the largest size piece of work the shear is designed to accommodate and cut, said shearing edge on said hook is defined at the convergence of a substantially radially extending elongate circumferentially inwardly disposed concave work supporting surface and the passing surface of said hook, said upper and lower portions of the primary cutting edge, the intermediate cutting edge and the point of said lancet blade portion are defined at the convergence of axially and substantially circumferentially and radially inwardly inclined surfaces on said cutting blade and said inner passing surface of said cutting blade.

9. The shear set forth in claim 1 wherein the circumferential offset of said outer and inner portions of the primary cutting edge and the resulting effective circumferential extent of said lancet blade portion is less than one-quarter the cross-sectional extent of the largest size piece of work the shear is designed to cut.

10. The shear set forth in claim 1 wherein the circumferential offset of said outer and inner portions of the primary cutting edge and the resulting effective circumferential extent of said lancet blade portion is less than one-quarter the cross-sectional extent of the largest size piece of work the shear is designed to cut, said lancet blade portion is spaced radially outward and upward from the lower end of said cutting blade a distance greater than one-half the cross-sectional extent of the largest size piece of work the shear is designed to cut.

11. The shear set forth in claim 1 wherein the circumferential offset of said upper and lower portions of the primary cutting edge and the resulting effective circumferential extent of said lancet blade portion is less than one-quarter the cross-sectional extent of the largest size piece of work the shear is designed to accommodate between the hook and the cutting blade and to cut , said lancet blade portion is spaced radially outward from the lower end of said cutting blade a distance greater than one-half the cross-sectional extent of the largest size piece of work the shear is designed to accommodate between the hook and the cutting blade and to cut, said shearing edge on said hook is defined at the convergence of a substantially radially extending elongate circumferentially inwardly disposed concave work supporting surface and the passing surface of said hook, said upper and lower portions of the primary cutting edge, the intermediate cutting edge and the point of said lancet blade portion are defined at the convergence of axially and substantially circumferentially and radially inwardly inclined surfaces on said cutting blade and said inner passing surface of said cutting blade.

* * * * *